United States Patent [19]

Tokiwa

[11] Patent Number: 5,507,613
[45] Date of Patent: Apr. 16, 1996

[54] DEVICE AND METHOD FOR TRANSFERRING BARS IN SPATIAL STORING SYSTEM

[75] Inventor: Toru Tokiwa, Hadano, Japan

[73] Assignee: Amada Company, Limited, Kanagawa, Japan

[21] Appl. No.: 297,107

[22] Filed: Aug. 26, 1994

Related U.S. Application Data

[62] Division of Ser. No. 957,086, Oct. 6, 1992, Pat. No. 5,366,335.

[30]  Foreign Application Priority Data

| Oct. 8, 1991 | [JP] | Japan | 3-260367 |
| Oct. 9, 1991 | [JP] | Japan | 3-261670 |
| Jun. 12, 1992 | [JP] | Japan | 4-153404 |
| Jul. 9, 1992 | [JP] | Japan | 4-182153 |

[51] Int. Cl.[6] ............................................. B65G 1/04
[52] U.S. Cl. .................................................. 414/282
[58] Field of Search ............................ 414/277, 281, 414/282, 786, 659–663, 745.7, 746.8

[56] References Cited

U.S. PATENT DOCUMENTS

| 493,542 | 3/1893 | Bessing et al. | 414/282 X |
| 3,175,722 | 3/1965 | Paulssen | 414/277 |
| 3,283,924 | 11/1966 | Chasar | 414/282 |
| 3,445,010 | 5/1969 | Alstedt et al. | 414/282 |
| 3,494,488 | 2/1970 | Morey | 414/282 |
| 3,495,725 | 2/1970 | Tyndall et al. | 414/277 X |
| 3,977,542 | 8/1976 | Stolzer | 414/281 X |
| 4,708,566 | 11/1987 | Stolzer et al. | 414/282 X |
| 4,735,539 | 4/1988 | Häkkinen et al. | 414/277 X |
| 4,838,749 | 6/1989 | Potocjnak | 414/282 X |
| 4,881,634 | 11/1989 | Stolzer | 414/745.7 X |
| 5,051,051 | 9/1991 | Grabill | 414/282 |

FOREIGN PATENT DOCUMENTS

| 0268965 | 6/1988 | European Pat. Off. . | |
| 1562685 | 4/1969 | France . | |
| 1222857 | 8/1966 | Germany . | |
| 3003628 | 8/1981 | Germany | 414/277 |
| 3229403 | 2/1984 | Germany . | |
| 61-148806 | 9/1986 | Japan . | |
| 63-001606 | 1/1988 | Japan . | |
| 63-190204 | 12/1988 | Japan . | |
| 252810 | 2/1990 | Japan . | |
| 569504 | 9/1977 | U.S.S.R. | 414/277 |

Primary Examiner—David A. Bucci
Attorney, Agent, or Firm—Wigman, Cohen, Leitner & Myers

[57]  ABSTRACT

A transfer device for transferring elongate bars with respect to a spatial storing system which includes a shelf frame provided with vertically arranged multiple shelves constituted of a plurality of supporting beams for carrying the bars, comprising: a movable beam (23) disposed above the shelf frame and extending in a longitudinal direction of the bars, the movable beam being movable in a direction perpendicular to the longitudinal direction of the elongate bars; a lifting beam (35) vertically movably mounted on the movable beam; and a plurality of lifting arms (33) attached to the lifting beam and extending, for carrying the bars, in the direction perpendicular to the longitudinal direction of the bars, the lifting arms being extrudable and recedable separately or simultaneously in a longitudinal direction thereof in relation to length of the bar to be carried.

13 Claims, 17 Drawing Sheets

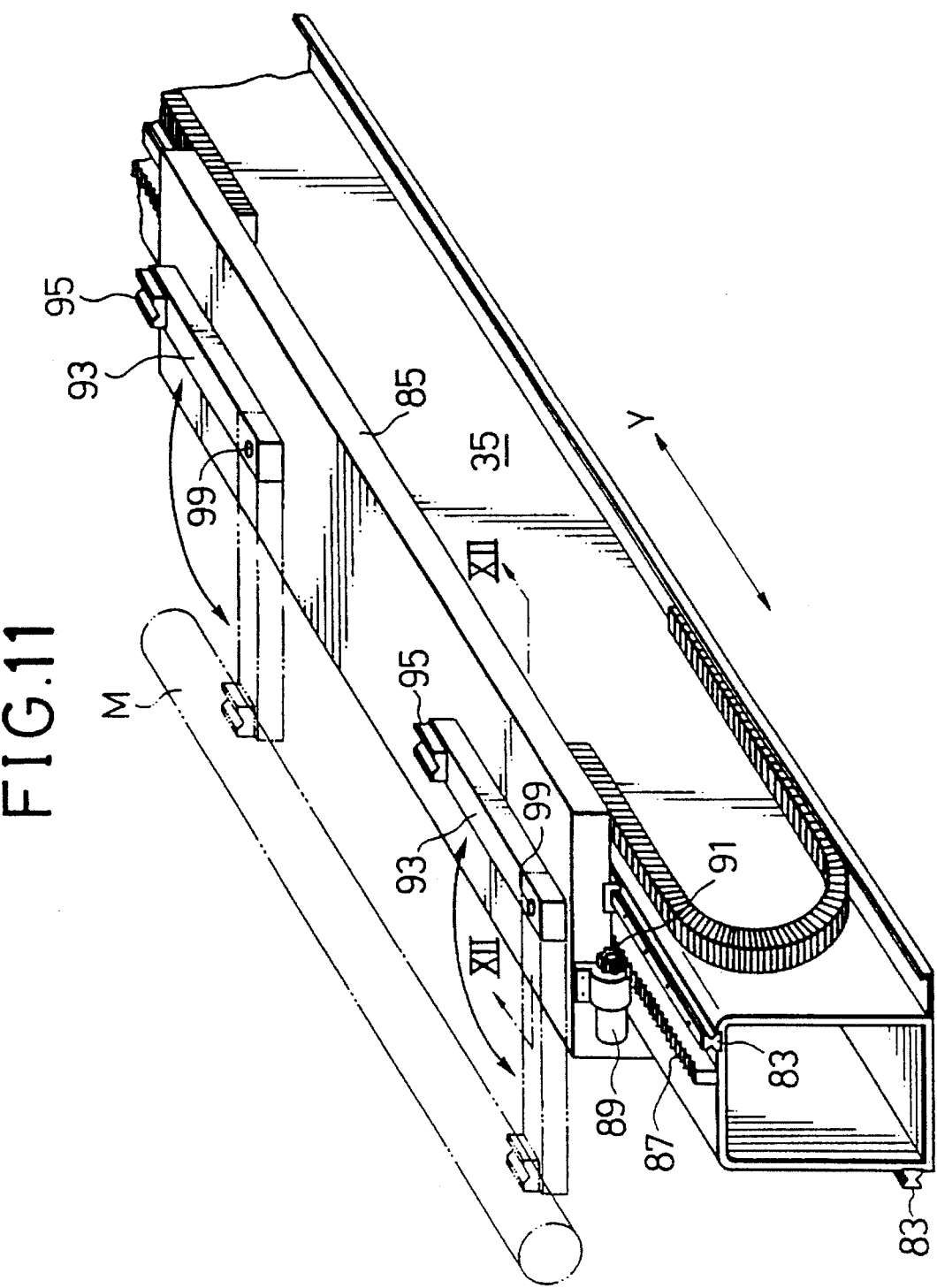

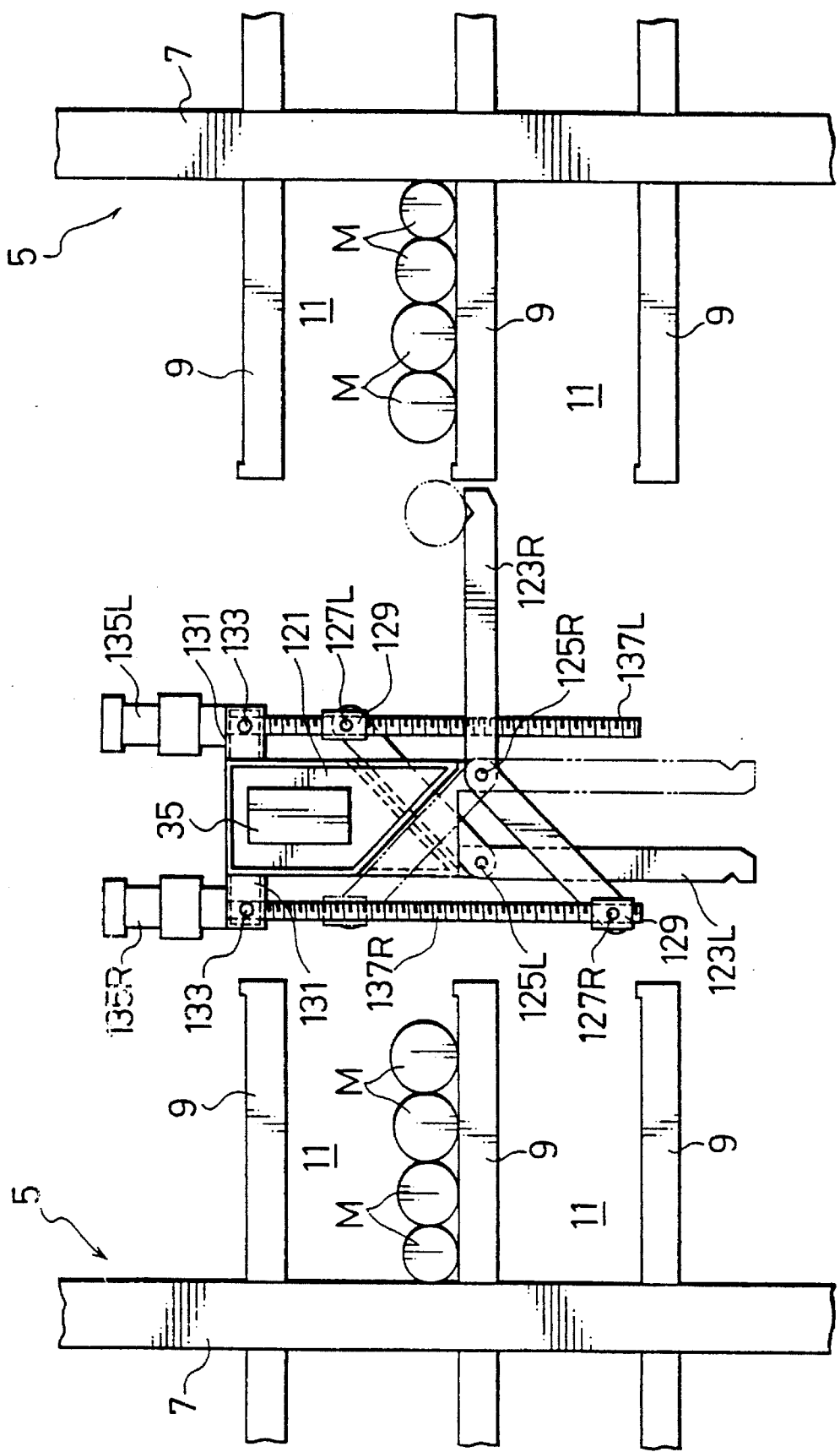

1

DEVICE AND METHOD FOR TRANSFERRING BARS IN SPATIAL STORING SYSTEM

RELATED APPLICATION

This application is a divisional application of application U.S. Ser. No. 07/957,086 filed Oct. 6, 1992, now U.S. Pat. No. 5,366,335.

BACKGROUND OF THE INVENTION

1. Field of the Invention

This invention relates to a device and a method for transferring elongate material bars stored in a spatial storing system.

2. Description of the Prior Art

In the prior art relating to the invention, references such as U.S. Pat. No. 3977542, U.S. Pat. No. 4,708,556, DE Patent 222857, JP (U) 61-148806 are known.

As seen from the above-mentioned references, a spatial storing system for storing elongate materials such as bars includes a plurality of shelf frames arranged and spaced parallel to one another. Each shelf frame has vertically arranged multi-shelves constituted by a plurality of horizontal supporting beams which are spaced and arranged parallel to one another for supporting the elongate material bars. The shelf frame is generally provided at both sides with the shelves.

A material transferring device for transferring the material to and from the shelves provided on the shelf frames is disposed adjacent to the frames. The material transferring device mainly consists of a portal crane. The portal crane is provided with a beam vertically movable in the spaces between the shelf frames. The beam has lifting arms for carrying material bars with respect to the shelves on the shelf frames.

In order to store a number of material bars in the spatial storing system, it is desired to provide the shelf frames as many as possible by making the spaces between the shelf frames smaller. In the case that a variety of material bars which are extremely long or short are stored on the shelves, it is preferred that the short bars would be arranged in line in their longitudinal direction on the shelf.

SUMMARY OF THE INVENTION

The object of the present invention is to provide a device and a method for quickly transferring material bars of various lengths with respect to the spatial storing system and for making a space for the installation of the spatial storing system smaller. The installation space of the system can be made smaller by shortening distances between the shelf frames. According to the present invention, short material bars are arranged in line in their longitudinal direction on shelves of the spatial storing system.

2

Figure 5:
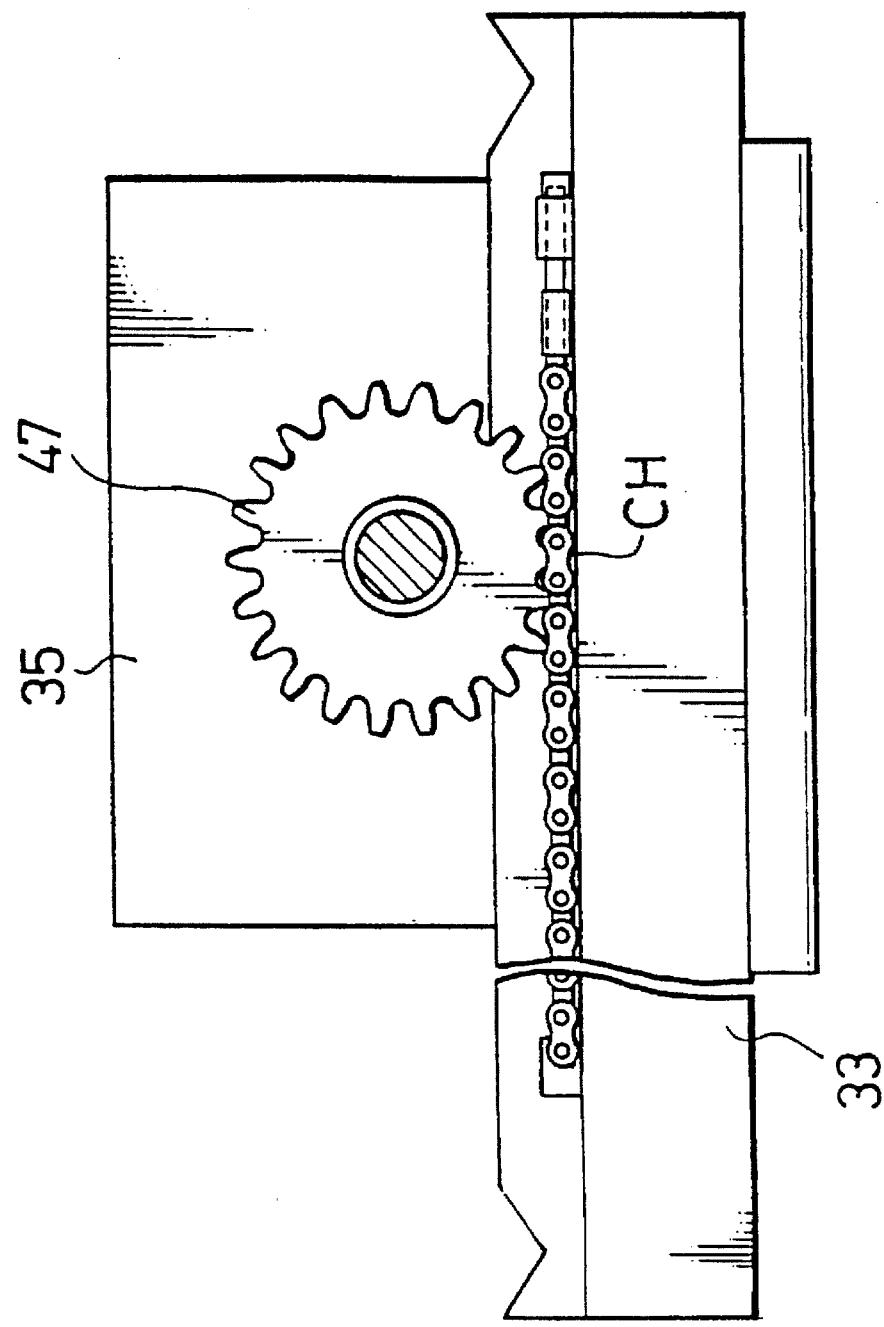

FIG. 5 is a front view of a modified example of the main portions.

Figure 3:
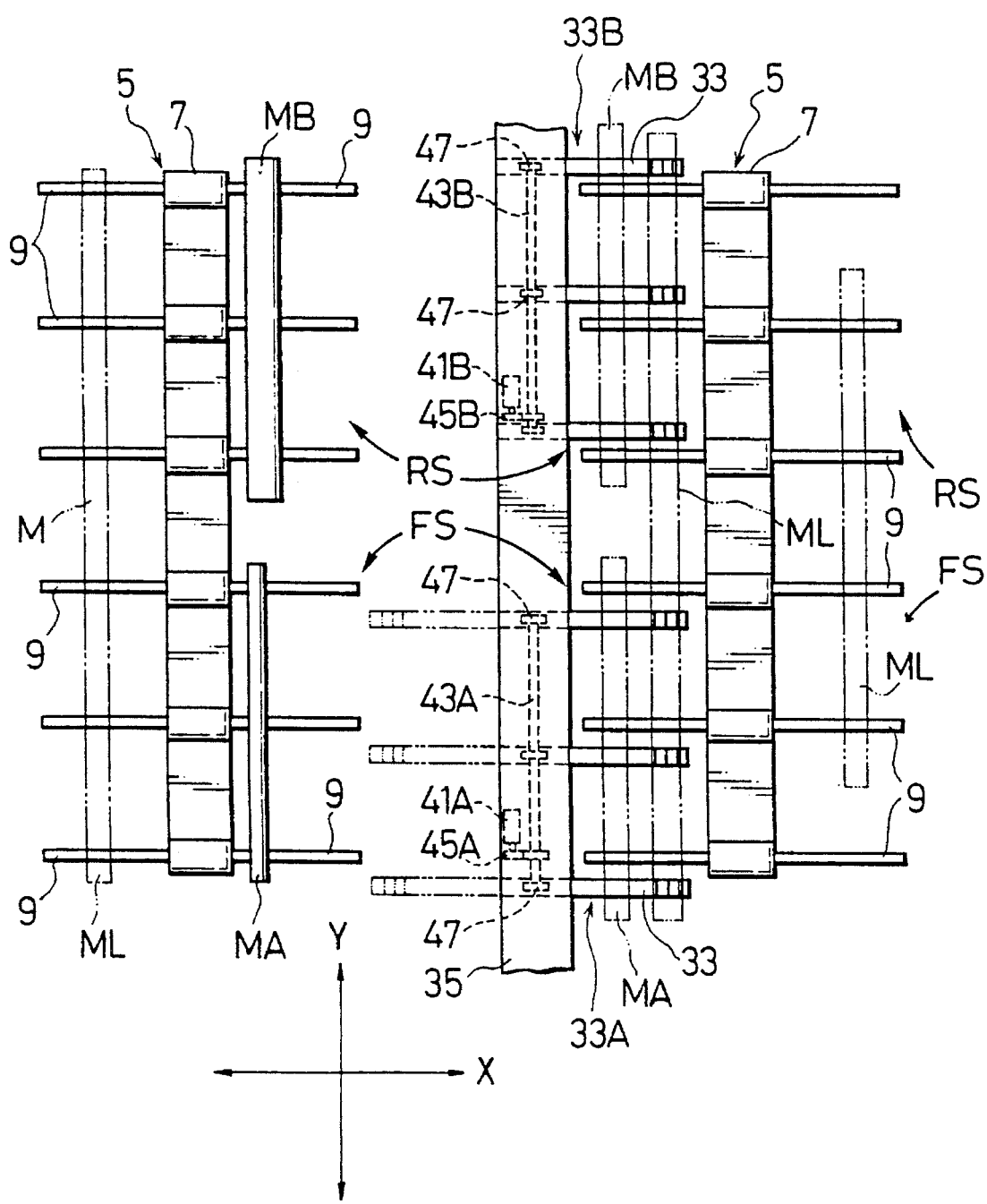
FIG. 3 is a plan view showing main portions of the spatial storing system.
Figure 6:
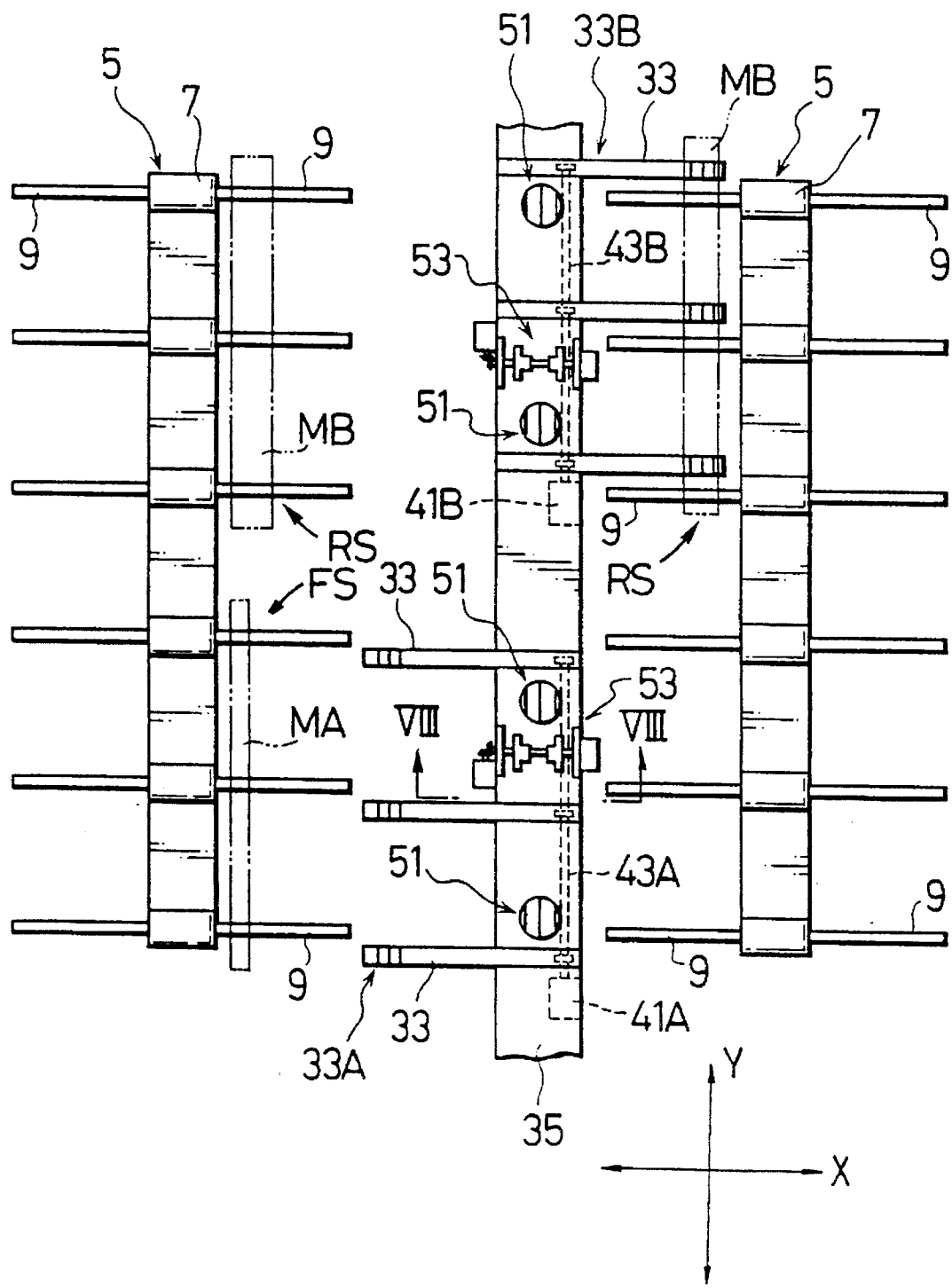

FIG. 6 is a plan view showing main portions of a second embodiment and corresponds to FIG. 3.

Figure 4:
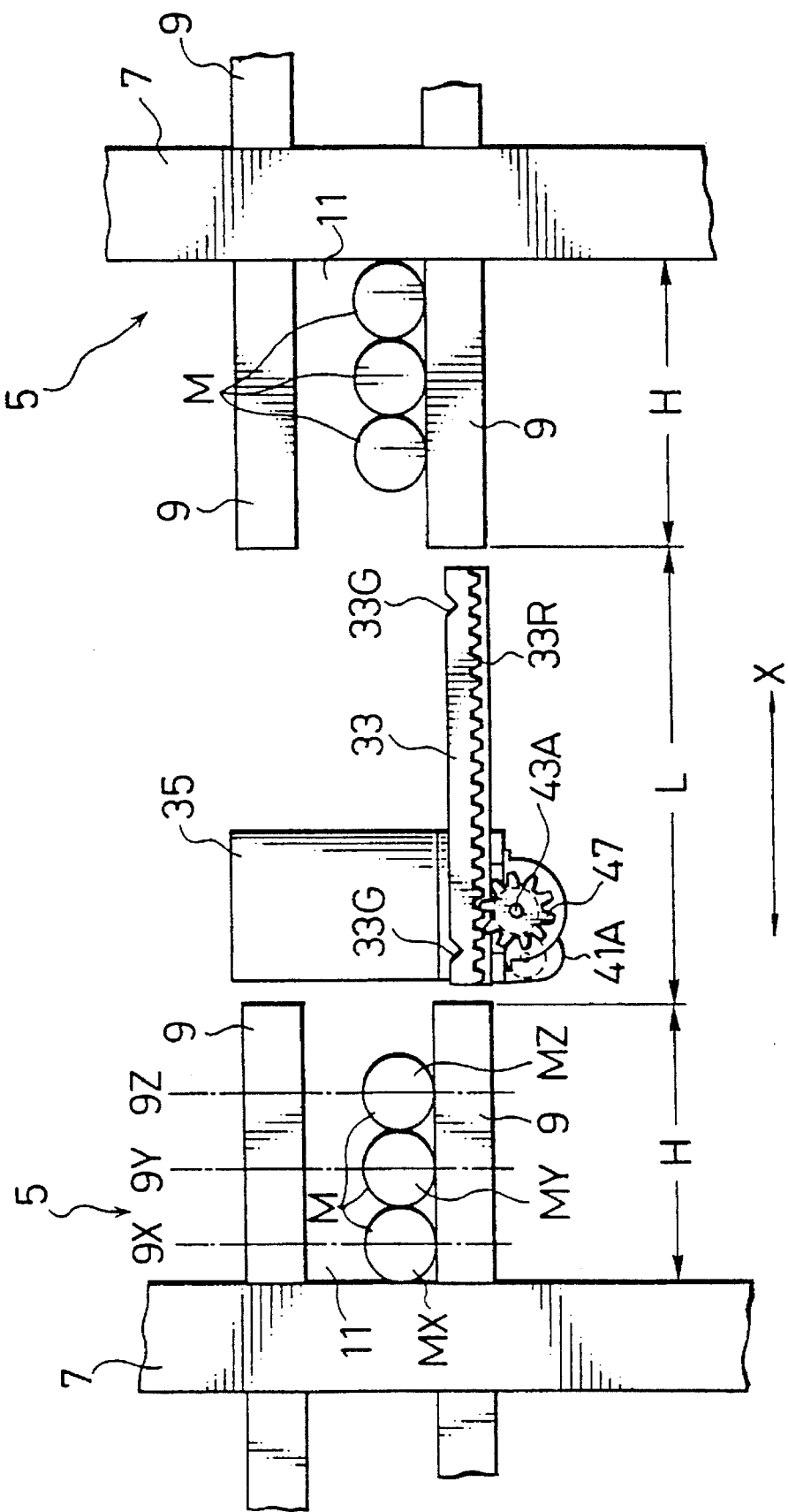
FIG. 4 is a front view of the main portions shown in FIG. 3.
Figure 7:
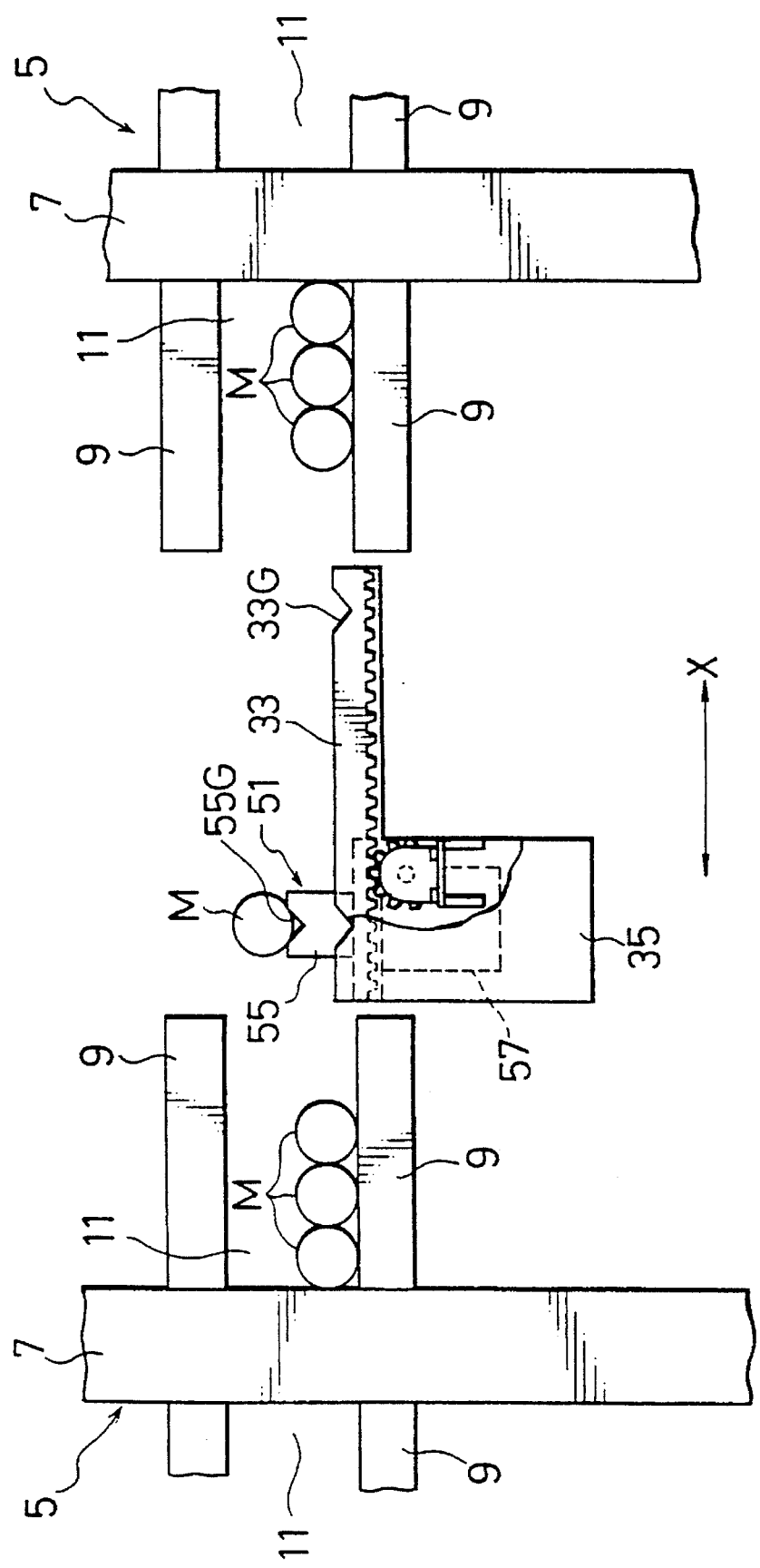

FIG. 7 is a front view of the main portions shown in FIG. 6 and corresponds to FIG. 4.

Figure 8:
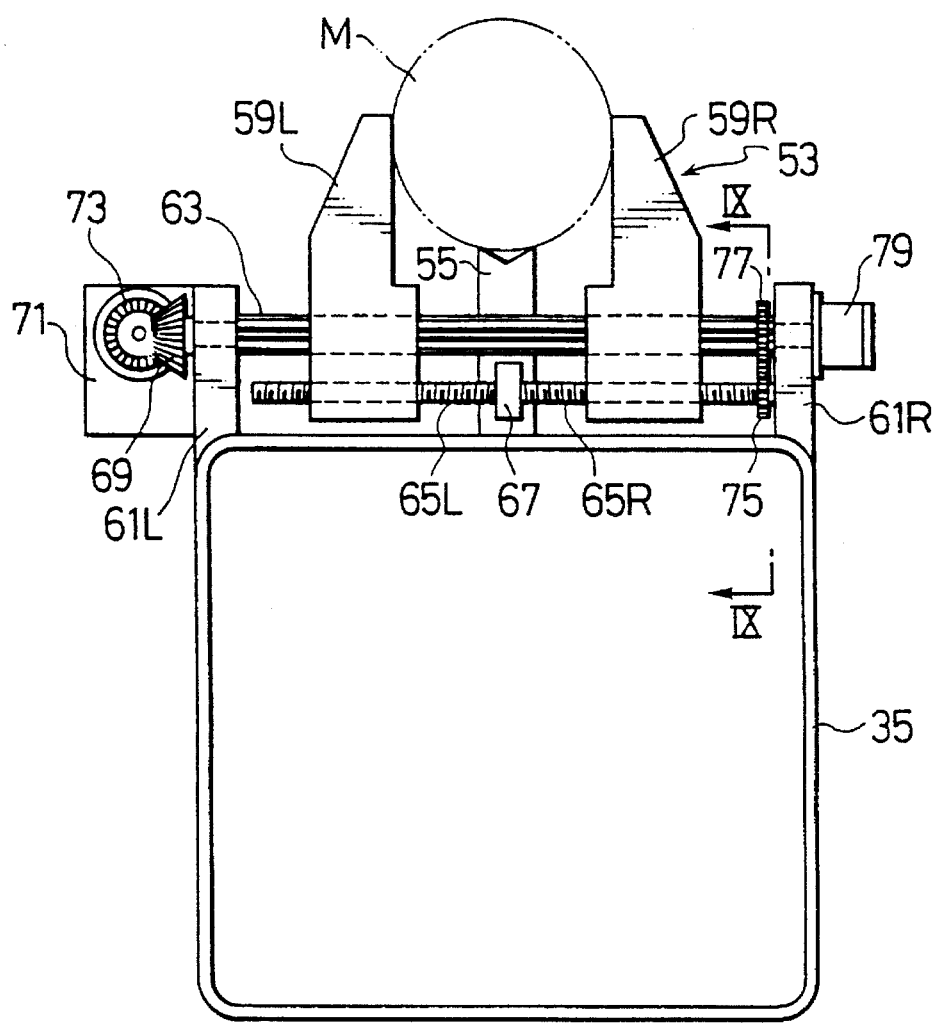

FIG. 8 is an enlarged view taken along line VIII—VIII in FIG. 6.

Figure 9:
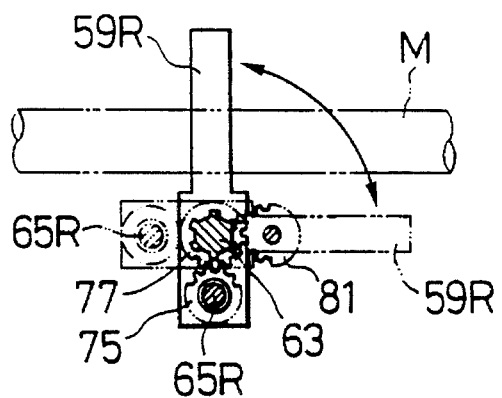

FIG. 9 is a view taken along line IX—IX in FIG. 8.

FIGS. 10(A) to 10(J) are schematic drawings for explaining operation of a transfer device.

FIG. 11 is a perspective view showing main portions of a third embodiment.

Figure 12:
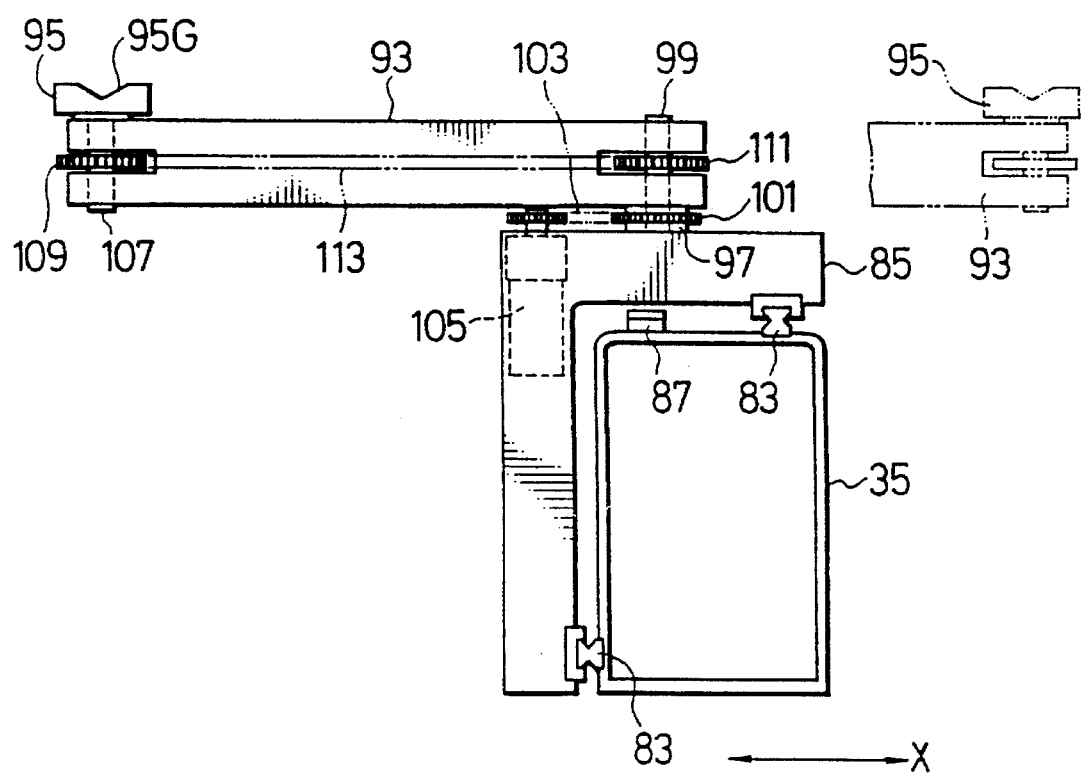

FIG. 12 is a front view taken along line XII—XII in FIG. 11, showing a rotary mechanism of a lifting arm, in particular, the lifting arm in a state of being rotated.

Figure 13:
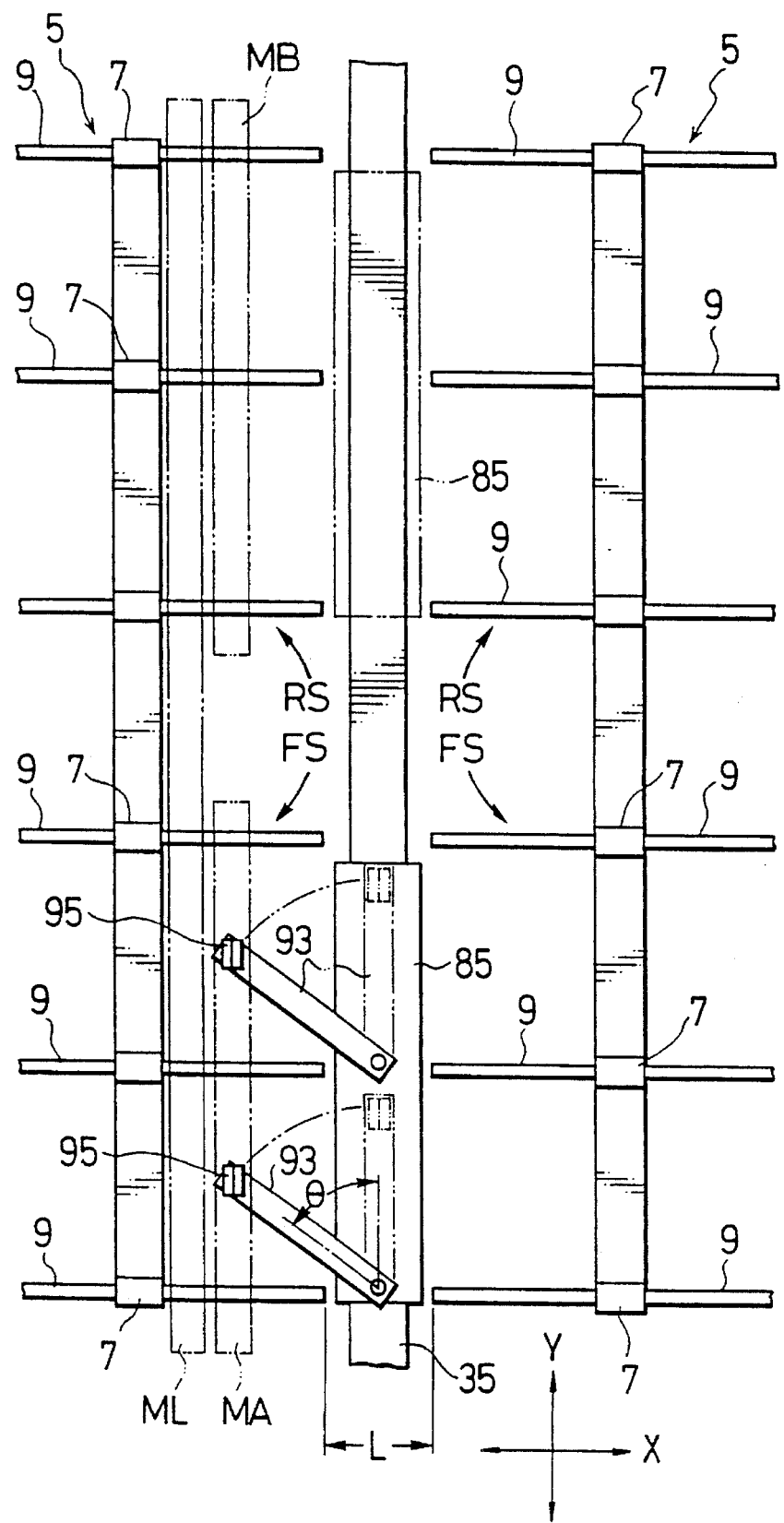

FIG. 13 is a plan view of main portions of the third embodiment.

Figure 14:
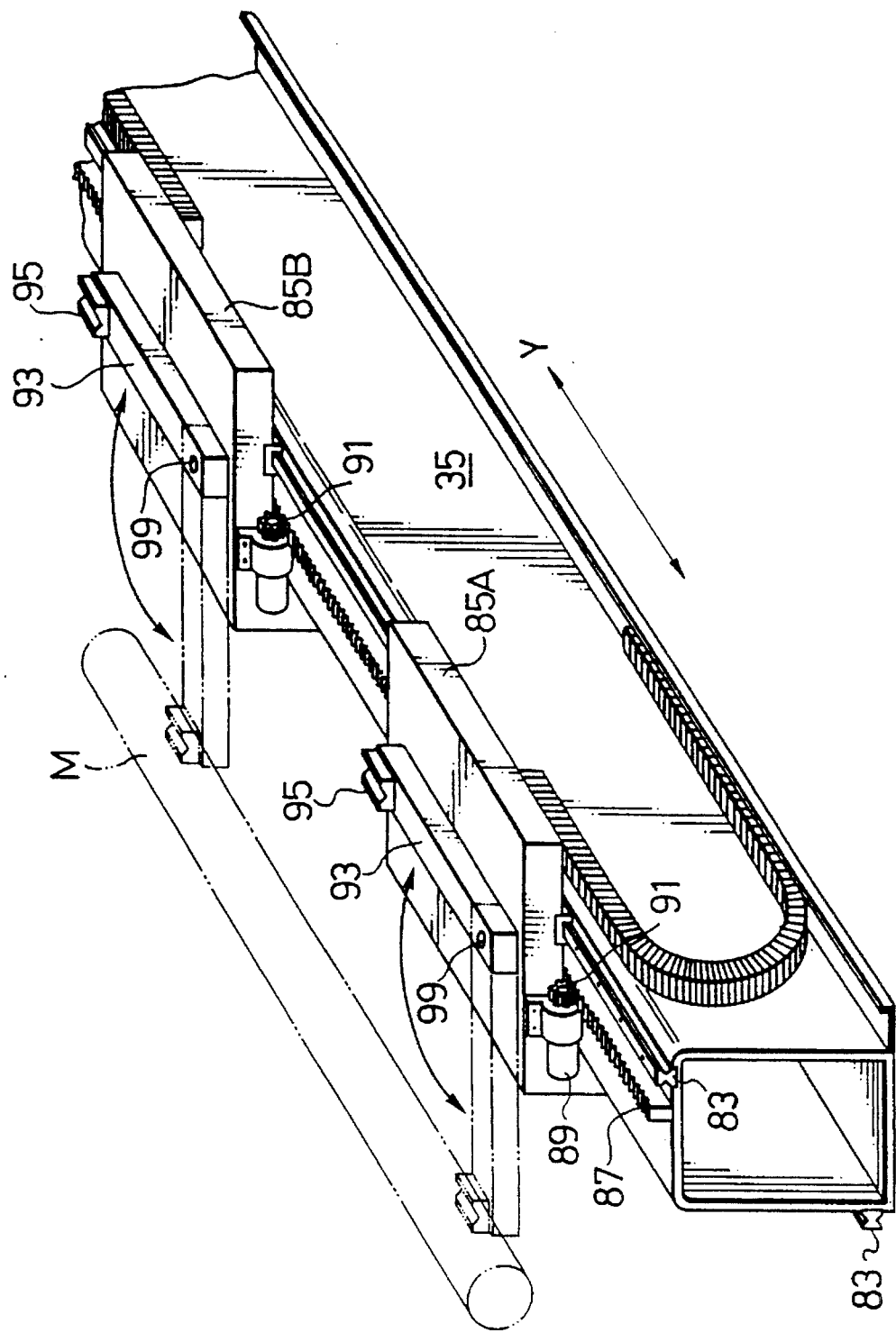

FIG. 14 is a perspective view of a modified example of the third embodiment.

Figure 15:
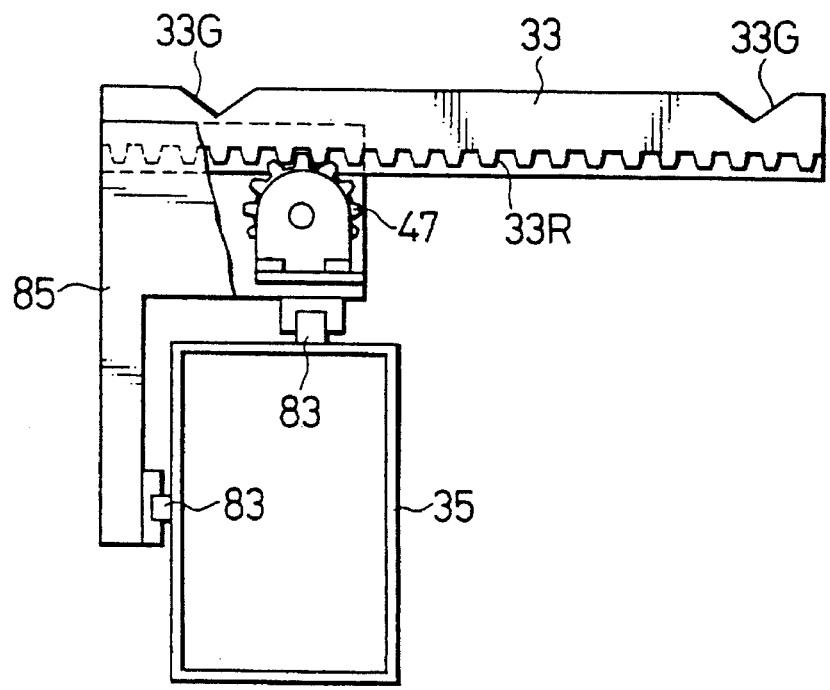

FIG. 15 is a front sectional view showing main portions of a fourth embodiment and corresponds to FIG. 4 of a first embodiment.

Figure 16:
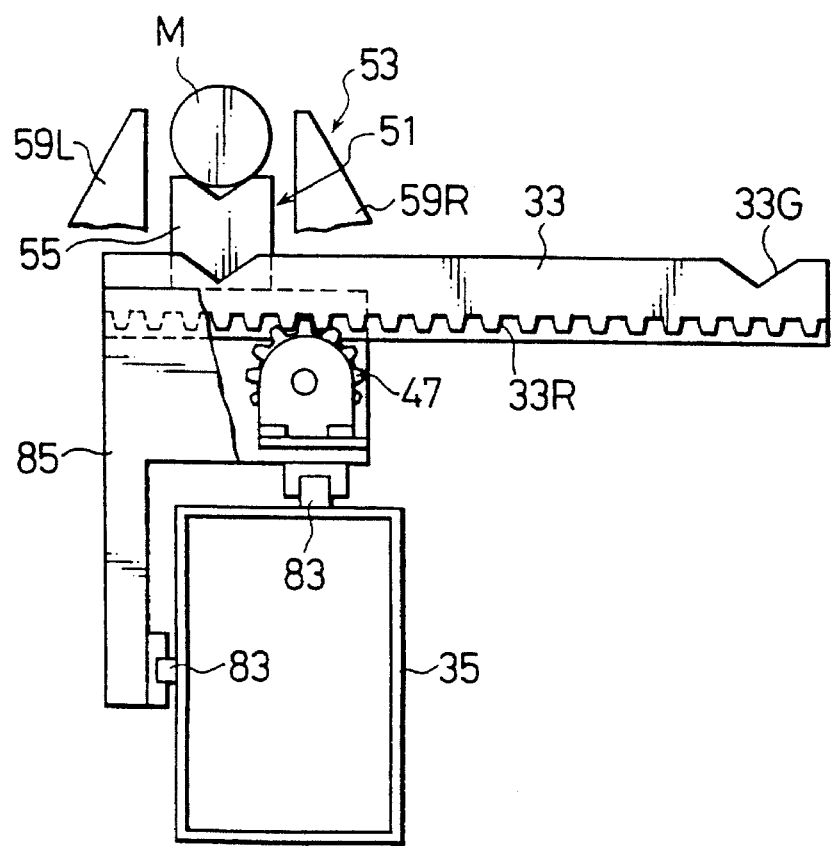

FIG. 16 is a front sectional view showing main portions of a fifth embodiment and corresponds to FIG. 4 of the first embodiment.

FIG. 17 is a front sectional view showing main portions of a sixth example.

DESCRIPTION OF THE PREFERRED EMBODIMENTS

For easy understanding of the invention, description is referred first to overall configuration of a spatial storing system relating to the invention.

Figure 1:
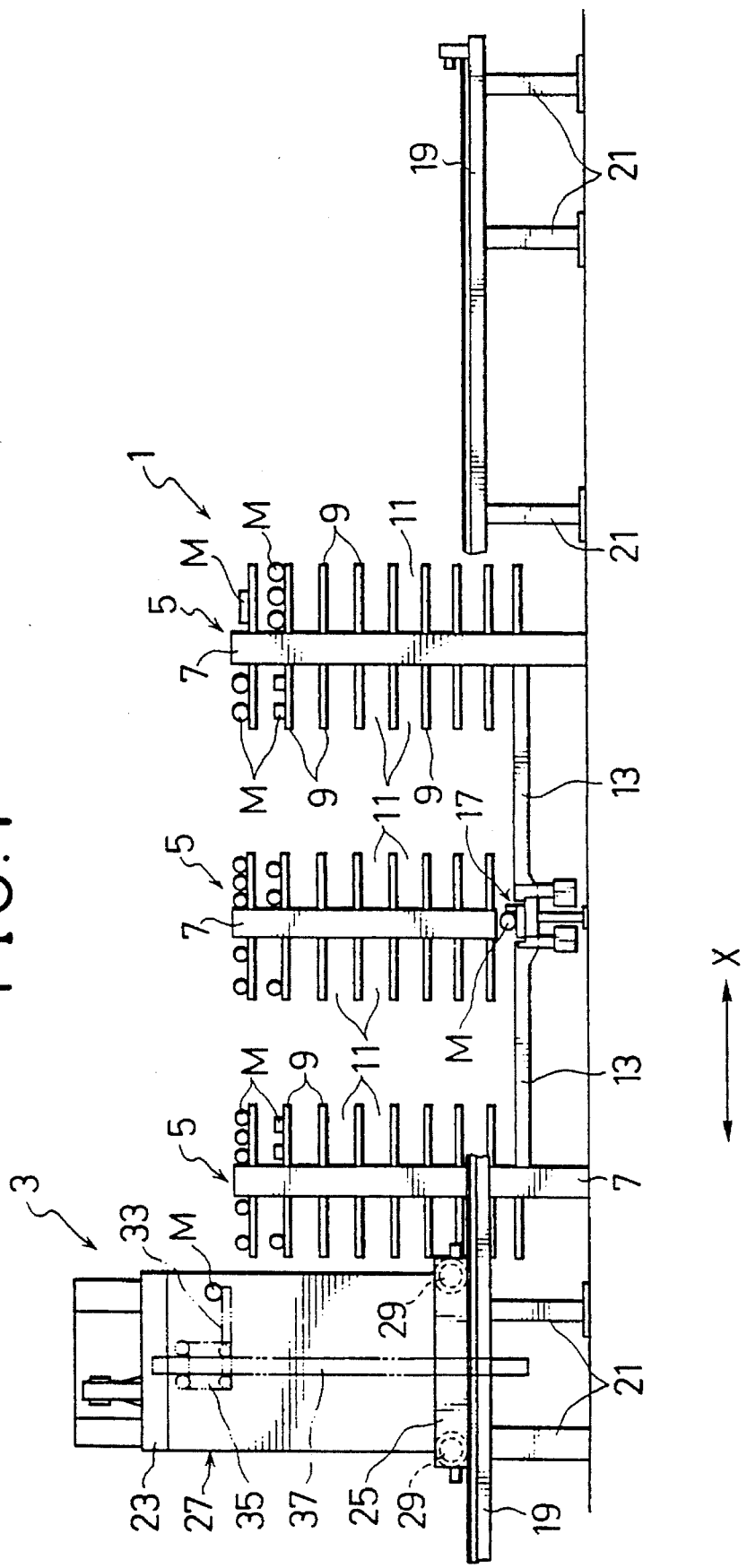
FIG. 1 is a front view of a spatial storing system relating to the invention.
Figure 2:
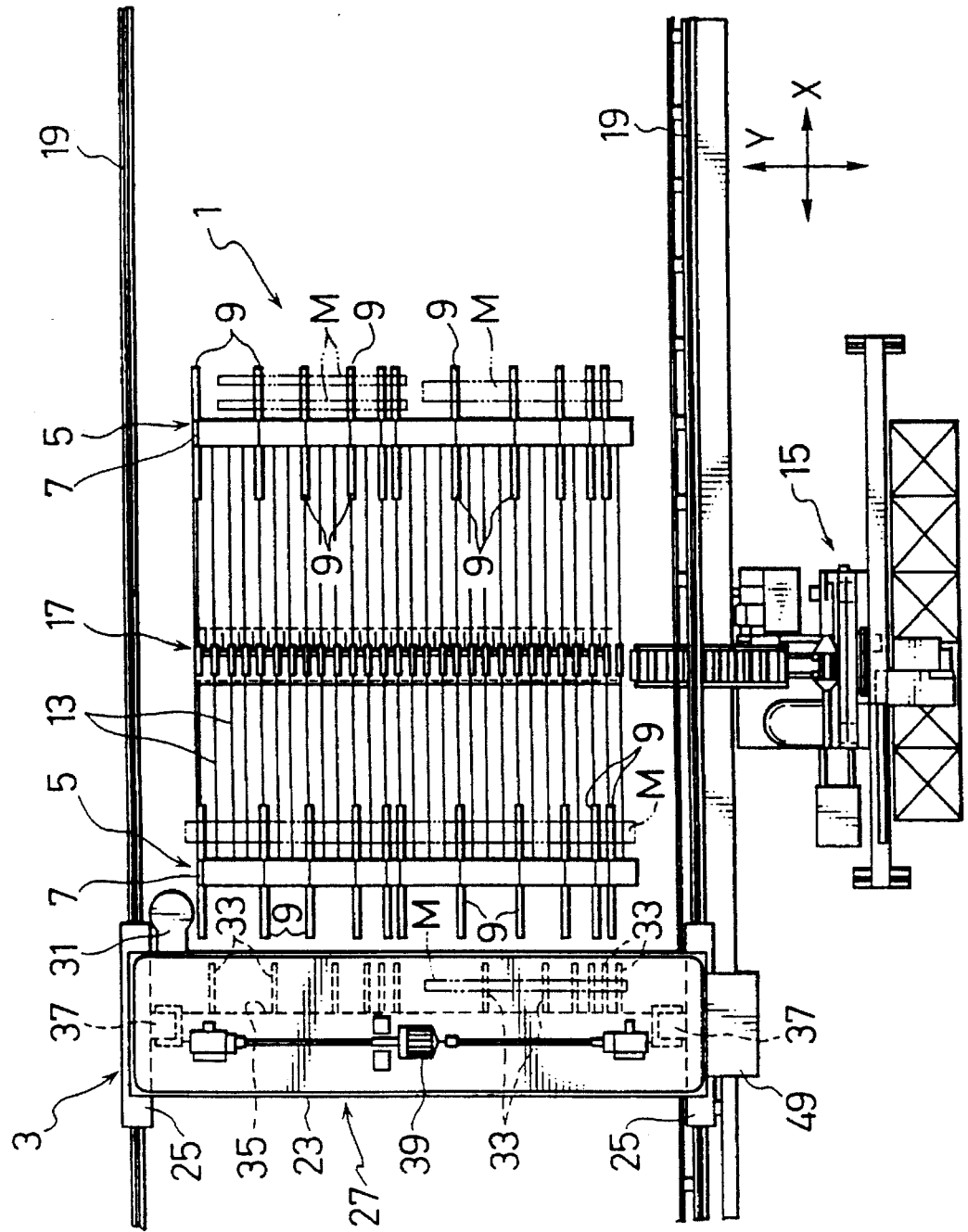
FIG. 2 is a plan view of the spatial storing system of FIG. 1.

FIG. 1 is a front view showing the spatial storing system, and FIG. 2 is a plan view of the system.

With reference to FIGS. 1 and 2, the spatial storing system mainly consists of a storing section 1 for storing elongate material bars M, and a transfer device 3 for transferring the material bars M with respect to the storing section 1.

The storing section I is installed on the floor and is comprised of a plurality of shelf frames 5 which are arranged to be spaced apart from one another in a direction X (rightward and leftward direction). Each shelf frame 5 includes a plurality of upright supports 7 which are installed on the floor and spaced apart from one another in a direction Y (forward and backward direction) perpendicular to the direction X. The upright supports 7 are integrally connected to one another through connecting members (not shown) in a conventional manner. A plurality of horizontal supporting beams 9 for supporting the elongate material bars M extend rightwardly and leftwardly from each upright support 7. The supporting beams 9 are provided at several levels on the upright support 7. Thus, the supporting beams 9 spaced apart from one another both in the vertical and Y directions configure multiple shelves 11 in the shelf frame. The material bars M are placed on the multiple shelves 11. In the embodiment the horizontal supporting beams 9 extend both rightwardly and leftwardly in the direction X, however they may be alternatively arranged to extend either rightwardly or leftwardly.

The shelf frames 5 are connected to one another by means of tie beams 13 at a lower portion. A cutting machine 15

(FIG. 2) is disposed in front of shelf frames 5. A roller conveyor 17 for transferring the material bar M to the cutting machine 15 is provided at a suitable place, for example, under the central shelf frame 5. A lower part of the central shelf frame 5 bridges over the roller conveyor 17. The upright supports 7 of the central shelf frame 5 are supported by the lower part. The lower part is omitted from the drawings for simplicity and for the reason that the structure of the lower part is out of scope of the invention.

The cutting machine 15 is, for example, a conventional band sawing machine, circular saw machine, or the like. The roller conveyor 17 is also conventional one. A further description of the cutting machine 15 and the roller conveyor 17 is therefore omitted.

As understood from the above description with reference to FIGS. 1 and 2, a plurality of elongate material bars M are stored on each shelf 11, while being spaced apart from one another in the longitudinal direction of the supporting beams 9, or direction X. The material bars M on the shelf 11 are discharged one after another normally from the outermost one.

For transferring the material bars M with respect to the shelves 11 and the roller conveyor 17, the transfer device 3 is configured as mentioned below.

A pair of guide rails 19 extending in the direction X are provided at the front and the rear of the shelf frames 5. The guide rails 19 are mounted on pedestals 21 to lie at a predetermined height which is higher than that of the roller conveyor 17. The transfer device 3 is mounted on the guide rails 19 so as to move in the direction X along the guide rails 19. The transfer device 3 is provided with a beam 23.

The transfer device 3 is similar to, for example, a gantry crane. The beam 23 extends in the direction Y and is supported at both ends thereof by side members 25. The beam 23 and the side members 25 make up a portal frame 27. The side members 25 of the portal frame 27 are provided with wheels 29 which roll on the guide rails 19. The wheels 29 are rotated by a servo motor 31. By this design, the beam 23 or the portal frame 27 moves in the direction X over the shelf frames 5.

Under the movable beam 23 a vertically movable lifting beam 35 is disposed. The lifting beam 35 extends in the direction Y and is provided with a plurality of lifting arms 33. The lifting arms 33 for carrying the material bars M are movably attached to the lifting beam 35. Both ends of the lifting beam 35 are guided along vertical guide members 37 mounted on the side supports 25.

A motor 39 for vertically moving the lifting beam 35 is provided on the movable beam 23. A known power transmission mechanism is used between the motor 39 and the lifting beam 35. This mechanism may be, for example, comprised of vertical ball screws and ball nuts provided on the lifting beam 35. The ball nuts are engaged by the ball screws which are driven by the motor 39, so that the lifting beam 35 is raised or lowered by the motor 39. Alternatively, the mechanism may be comprised of drums and wires or chains connected to the lifting beam 35. The wires or chains are wound up around the drums by the motor 39 so as to raise or lower the lifting beam 35. Any other known mechanism for vertically moving the lifting beam 35 may be used. Since the mechanism is known as mentioned above, it is not shown in the drawings for simplicity, and a further description for it is omitted.

As shown in FIG. 3, the lifting arms 33 are formed into two groups 33A and 33B. The lifting arms 33 are designed to be able to move Individually or simultaneously in the direction X as mentioned below.

The groups 33A and 33B of the lifting arms 33 are respectively provided with servo motors 41A and 41B and rotary shafts 43A and 43B. The rotary shafts 43A and 43B are rotated by the servo motors 41A and 41B through bearings (not shown). The power transmission from the servo motor 41A and 41B to the rotary shafts 43A and 43B is made for example, by a rotary transmission mechanism 45A and 45B comprising drive gears attached to the servo motors 41A, 43B and driven gears which for engaging the drive gears are attached to the rotary shaft 43A, 43B.

As shown in FIGS. 3 and 4, the rotary shafts 43A, 43B are provided with pinions 47. The pinions 47 engage racks 33R (FIG. 4) formed in the lifting arms 33.

In the above configuration, when the servo motors 41A and 41B operate to rotate in the same direction all the lifting arms 33 extrude from the lifting beam 35 in a direction, for example, to the right as shown in FIG. 4. It is, however, possible to cause the lifting arms 33 of the group 33A to extrude In a direction, while causing the lifting arms 33 of the group 33B to extrude in the opposite direction by operating the servo motors 41A and 41B to rotate in different directions. Thus, by controlling the directions of the rotation of the servo motors 41A and 41B, the directions of extrusion or receding of the lifting arms 33 of the groups 33A and 33B are controlled.

As seen from FIG. 4, each lifting arm 33 is longer than every supporting beam 9 of which length is H, so that it can reach and pick up the material bars M from the shelves 11 of the shelf frames 5. Furthermore, the lifting arm 33 is shorter than a distance L between distal ends of the lifting arms 9 opposing each other. According to this configuration, the span of the upright supports 5 becomes (L+2H) with a result that the overall size of the storing section 1 becomes small. Each end of the lifting arm 33 is formed with a V-shaped groove or seat 33G for receiving a portion of the material bar M.

A number of material bars M which may be different in shape and/or dimensions and which have been stored in the shelf frames 5 by using the transfer device 3, are successively taken out and transferred to the cutting machine 15 through the roller conveyor 17 by means of the transfer device 3 and then cut there.

In the above configuration, the operation of the transfer device 3 is controlled by a controlling device 49 (FIG. 2) such as a NC controlling device or computer.

Now, a pick-up operation of the transfer device 3 to pick up the material bars M from the shelf 11 on the one of the shelf frames 5 of the storing section 1 is explained. When a plurality of bars M are placed on the shelf 11 as shown in FIG. 4, the bars are taken out in turn from the outermost one, that is, a bar placed at the distal end of the supporting beam 9. Only one case for discharging the material bars M from a left shelf 11 of the right shelf frame 5 in FIG. 4 is explained hereinafter. A description of discharging the bars from a right shelf of the left shelf frame is omitted since it is carried out in a similar manner.

The discharging includes following steps.

(Step 1)

To false the lifting beam 35 up to a position higher than the shelf frames 5 by rotating the motor 39 in a direction.

(Step 2)

To move the portal frame 27 along the guide rails 19 under control of the servo motor 31 towards a desired shelf frame 5 until It comes to a predetermined position above a desired shelf 11 of the shelf frame 5. The lifting arms 33 is extruded towards right with respect to the lifting beam 35 while the portal frame 27 moves along the guide rails.

(Step 3)

To lower the lifting beam 35 by rotating the motor 39 in a direction opposite to that in Step 1 until it comes to a desired height corresponding to the desired shelf 11. This state is shown in FIG. 4.

(Step 4)

To move the lifting beam 35 towards right by means of the servo motor 31 so that the seats 33G of the lifting arms 33 come under the outermost material bar M stored on the desired shelf 11.

(Step 5)

To raise slightly the lifting beam 35 by drIving the motor 39 and thereby lift the bar H by the seats 33G of the lifting arms 33.

(Step 6)

To move the lifting beam 35 towards left by the servo motor 31 until it comes back to the position in Step 3.

(Step 7)

To false the lifting beam 35 over the shelf frame 5 if lifting up of the lifting arms 33 carrying the bar M is necessary because the lifting arms 33 are in a space other than one just above the roller conveyor 17.

(Step 8)

To move the lifting beam 35 or the portal frame 27 horizontally to a predetermined position above the roller conveyor 17, if necessary, and then position the lifting beam 35 vertically at a predetermined position beside the roller conveyor 17.

(Step 9)

To move the portal frame 27 horizontally so that the bar M lies just above the roller conveyor 17, then lower the lifting beam 35 slightly so that the bar M on the lifting arm 33 is placed on the roller conveyor 17.

(Step 10)

To move the portal frame 27 horizontally in the opposite direction to recede the free lifting arms 33 from the roller conveyor 17, and then raise the lifting beam 35 up to the shelf 11.

(Step 11)

To return to Step 4 in order to discharge a next bar and execute steps after Step 4 including the step.

When it is desired to take out bars M stored on the shelves 11, in particular, those of the other shelf frame, it is carried out by returning to Step 1.

As explained above, the bars M are successively taken out from the shelves 11 and transferred by the transfer device 3 to the roller conveyor 17. The cutting machine 15 cut the bars M successively on after another upon receiving them from the roller conveyor 17.

As seen from the above description, If residual short bars produced during the cutting of the bar M are placed on the roller conveyor 17, they can be picked up by the lifting arms 33 of the transfer device 3 and then transferred and stored on the shelves 11 In a similar way.

If a material bar is, as shown in FIG. 3, long one ML and extends over front and rear stations FS and RS into which the shelf frame 5 is divided, all the lifting arms 33 of both groups 33A and 33B are extruded toward the right-side of the lifting beam 35 to pick up the bar ML. When storing such a long bar ML on the shelf 11 the bar ML is supported by all the lifting arms 33.

If short bars MA and MB are respectively placed at front and rear stations FS and RS as shown in FIG. 3 and either one of the bars MA or MB is picked up, only necessary lifting arms 33 which belong to the group 33A or 33B are extruded to the right and the other lifting arms which belong to the other group are receded, or extruded to the left. Therefore, the other short bar is not picked up. The directions to which the lifting arms 33 are extruded with respect to the lifting beam 35 are controlled by controlling the motors 41A and 41B for the groups 33A and 33B.

In the controlling of the motor 41A, 41B, unnecessary lifting arms 33 of one group (For example, group 33A) may be receded after the lifting beam 35 was moved to the right as shown in FIG. 3. Alternatively, the unnecessary lifting arms 33 may be receded while the lifting beam 35 moves to the right. Thus, the moving direction of the lifting beam 35 (or the portal frame 27) and the relevant extruding directions of the lifting arms 33 to the right or left are controlled.

For example, the lifting arms 33 can be appropriately controlled to extrude or recede to the right and left with respect to the moving speed and moving distance of the lifting beam 35. Furthermore, naturally the lifting arms 33 can be extruded and/or receded after the lifting beam 35 (or the portal frame 27) moved a predetermined amount to the right or left. Conversely, the lifting beam 35 (or the portal frame 27) may be moved after the lifting arms 33 extruded and/or receded.

In addition, when lifting arms 33 of the groups 33A and 33B are used separately, lifting arms of the unnecessary group may be receded after all the lifting arms were once extruded, or conversely, lifting arms of the necessary group may be extruded after all the lifting arms were once receded.

A variety of the above-mentioned movements of the lifting beam 35 and the lifting arms 33 are controlled respectively by the servo motor 31 and the motors 41A, 41B under the control of the controlling device 49.

As mentioned above, the lifting arms can operate with relation to the movement of the lifting beam 35, and therefore the material bars M are transferred quickly and efficiently with respect to the shelves 11.

As already understood from the above description of the embodiment, both long bars ML which extend over the front and rear stations FS and RS of the shelf 11 and short bars MA, MB which are suitable to be placed at the front or rear station FS or RS, are transferred with respect to the shelves 11.

Furthermore, when three bars MX, MY, and MZ are placed and supported on the shelf 11 as shown in FIG. 4, the placing order of the bars can be changed. Further, the bars can be discharged from the inner one for processing. These are explained below.

In order to change the order of the bars MX, MY and MZ, the bars MZ is, first, taken out from the original shelf 11 and transferred to a free shelf temporarily. Similarly, the remaining bars MY and MX are then placed on free shelves. After it, the bars MZ, MY, MX are moved in turn to the original shelf 11. Thus, the order is changed.

If a change in the order of processing occurs, the bars would be suitably rearranged in accordance with the change by carrying out the above operation.

In addition, after two bars MZ and MY of the three MX, MY and MZ which had been stored on the shelf 11 as shown in FIG. 4 were taken out one after another for processing whIle the bar MX is still on the shelf 11, when it is necessary to place new bars on the shelf 11, the bar MX is temporarily moved to a free shelf. The new bars are then placed on the shelf 11 at positions 9X and 9Y, and after it, the bar MX is moved to the shelf 11 at a position 9Z. By this operation, the order of processing is kept and the bars are suitably stored on the shelf 11 in a processing order.

In the above description, the bars MX, MY, MZ are moved to free shelves temporarily and then returned to the original shelf. However, the bars are not necessarily returned to the original shelf. Alternatively, they may be moved to different free shelves and transferred to the roller conveyor in turn, thereby the processing order is kept Instead of rearranging all the bars on the shelf 11. In this case, the original shelf 11 may be used as one of the free shelves.

In the embodiment, the rack 33R is formed in the lower part of the lifting beam 33. Alternatively, the rack 33R may be formed in the upper part of the lifting beam 33.

In addition, as shown in FIG. 5, a chain CH of predetermined length for engaging with the pinion 47 may be fixed to each lifting arm 33 alternatively for the rack 33. By this design, the lifting arm can be also moved rightwardly or leftwardly.

Further more, although the lifting arms 33 are disposed under the lifting beam 35, the arms 33 may be disposed above the lifting beam 35.

FIGS. 6 to 9 show a second embodiment of the invention. In the second embodiment, the lifting beam 35 is provided at its upper portion with lifting arms 33 movable to the right and left. Furthermore, the lifting beam 35 is provided with a plurality of supporting devices 51 and holding devices 53. The supporting devices 51 support and lift a material bar M which is moved by the lifting arms 33 onto the lifting beam 35, while the holding devices 53 hold the bar or bars M supported by the supporting devices 51 so as to prevent the bars M from falling down. The supporting devices 55 are disposed beside some of the lifting arms 33.

As shown in FIG. 7, the lifting arms 33 are disposed on the top of the lifting beam 35 and are movable to the right and left. Hence, the bar M can be moved from the shelf 11 or another place into the seat 33G of the lifting arm 33 and onto the lifting beam 35.

Each supporting device 51 includes a vertically movable plunger 55 a top of which is formed with a V-shaped groove 55G. The plungers 55 are disposed in the lifting beam 35 so that they can be arranged in line under the bar M placed on the lifting beam 35. The plungers 55 are vertically moved by fluid cylinders 57 disposed in the lifting beam 35, so that the V-shaped top 55G of each plunger 55 extrudes or withdraws from the level of the seat 33.

As shown in FIG. 8, the holding device 53 is provided with right and lift clamps 59R, 59L for clamping or holding the bar M supported on the plunger 55. The clamps 59R and 59L are respectively movable to the left and right, or right and left in order to clamp or unclamp the bar M and recedable to a lower position in order to allow the bar M to pass through the lifting beam 35 to the right or left. The operation of the clamps 59R, 59L is described below in detail.

A right and a left brackets 61R and 61L are secured to the both sides of the lifting beam 35. A spline shaft 63 is rotatably supported by the bracket 61R, 61L. The right and left clamps 59R arid 59L are mounted on the spline shaft 63 so as to move to the right or left along the spline shaft 63 which acts as a guide. The right clamp 59R is also engaged by a right screw 65R, while the left clamp 59L is engaged by a left screw 65L. The right and left screws 65R, 65L are integrally connected to each other through a central connecting member 67 and suitably threaded so that the clamps 59R and 59L can move toward each other when the screws 65R, 65L are rotated in a direction or recede from each other when the screws are rotated in the opposite direction.

A bevel gear 69 is attached to one end (left end in FIG. 8) of the spline shaft 63. A motor 71 for driving another bevel gear 73 is mounted on the left bracket 61L. The bevel gears 69 and 73 engage with each other. A follower gear 75 is attached to one end of the right screw 75 and is engaged by a intermediate gear 77 mounted on the spline shaft 77. A clamping motor 79 for rotating a drive gear 81 (FIG. 9) which engages with the intermediate gear 77 is mounted on the right bracket 61R.

When the clamping motor 79 operates, the screws 65R, 65L rotates and as a result the clamps 59R and 59L moves toward each other to clamp the bar M, or recede from each other to unclamp the bar.

When the clamps 59R, 59L unclamp the bar M and the motor 71 operates, the spline shaft 63 rotates through bevel gears 69, 73 and therefore the clamps 59R, 59L rotates as shown in FIG. 9 from a vertical position to a horizontal one. When the clamps are in the horizontal position the level of the top of each clamp is lower than that of the seat 33G of the lifting arm 33. This allows the bar M to go beyond the lifting beam 35.

According to the second embodiment described above, the bar M is transferred easily between two adjacent shelves 11 of shelf frames 5 opposing each other.

Figure 10A:
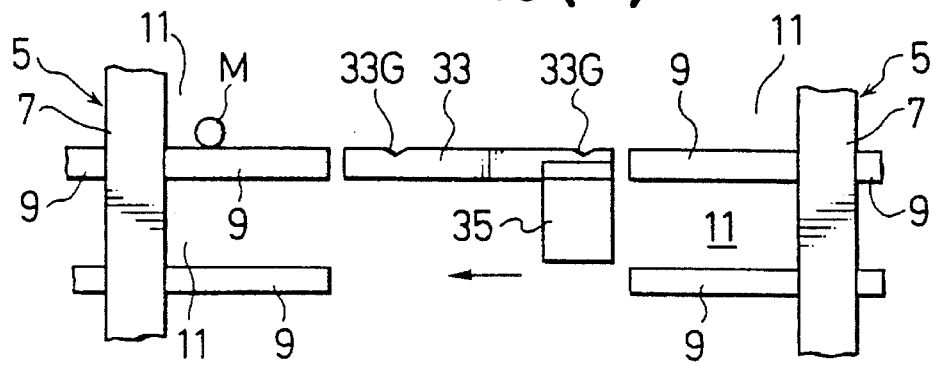
Figure 10B:
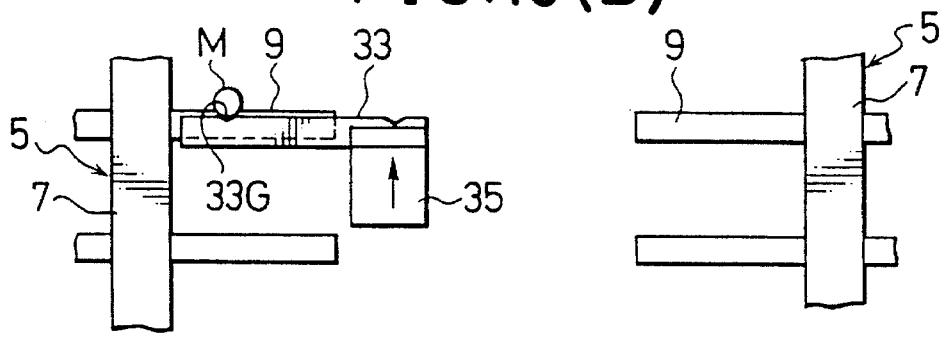

For example, as shown in FIG. 10A, the lifting beam 35 is vertically positioned in front of a right shelf 11, which is constituted of supporting beams 9, of a left shelf frame 5 and then moved to the left while the lifting arms 33 are extruded to the left (FIG. 10B).

Figure 10C:
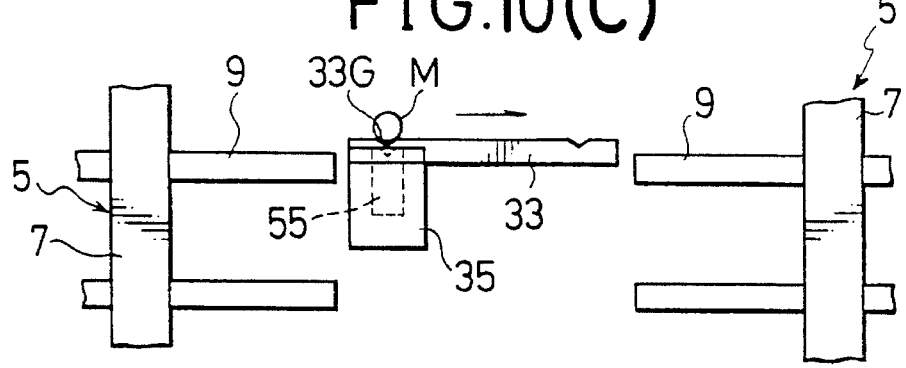
Figure 10D:
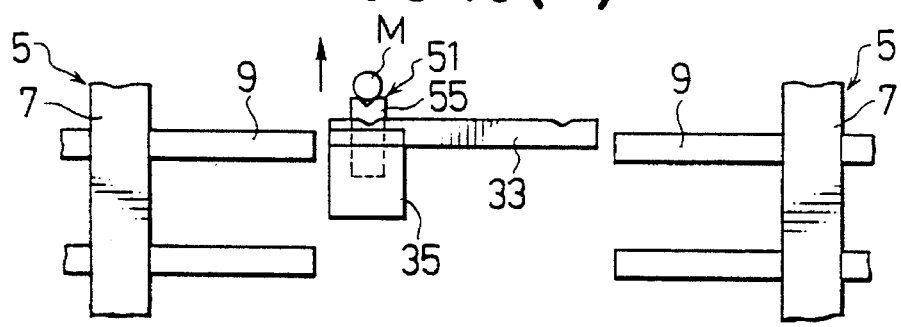
Figure 10E:
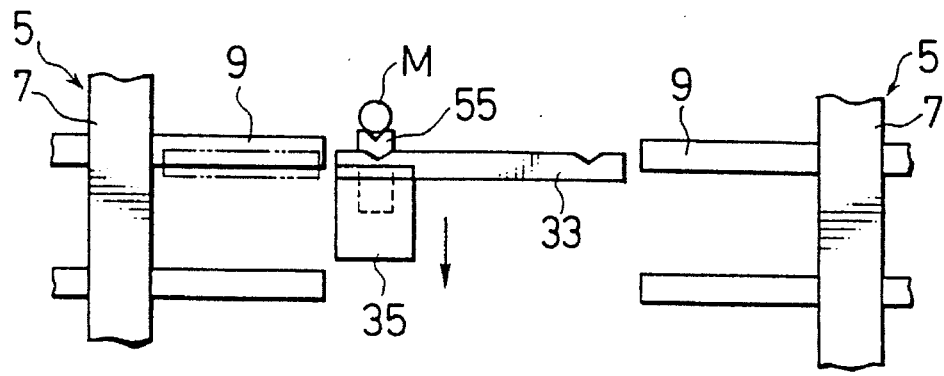

Then, the bar M is caught and raised by the seats 33G formed in the left ends of the lifting arms 33 and lifting arms 33 are moved rightwardly until the bar M comes onto the lifting beam 35 (FIG. 10C). After it, the plungers 55 of the supporting devices 51 are moved up to raise the bar M (FIG. 10D).

Figure 10F:
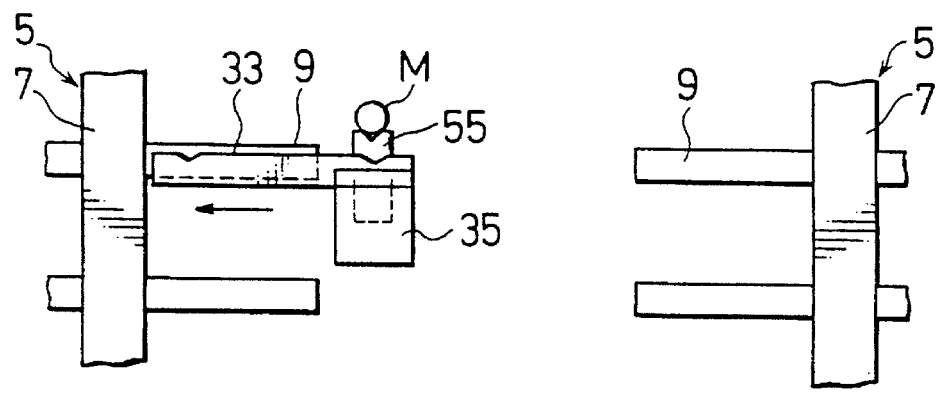
Figure 10G:
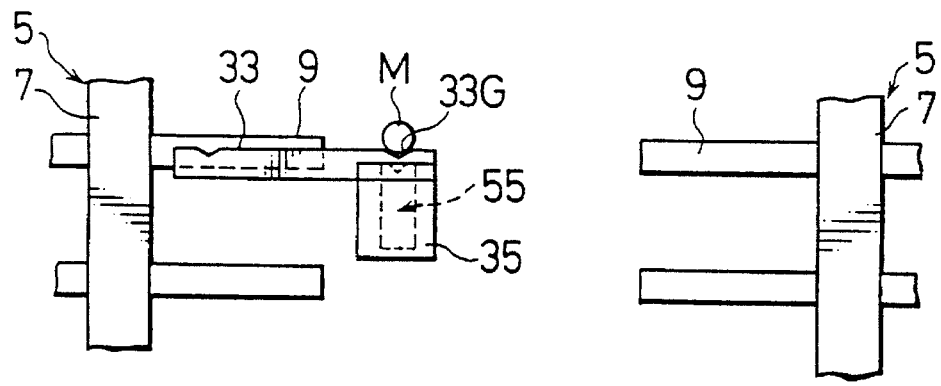
Figure 10H:
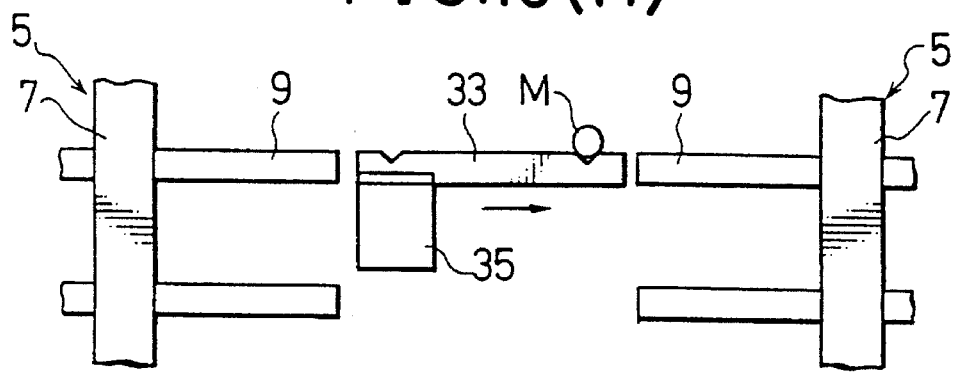
Figure 10I:
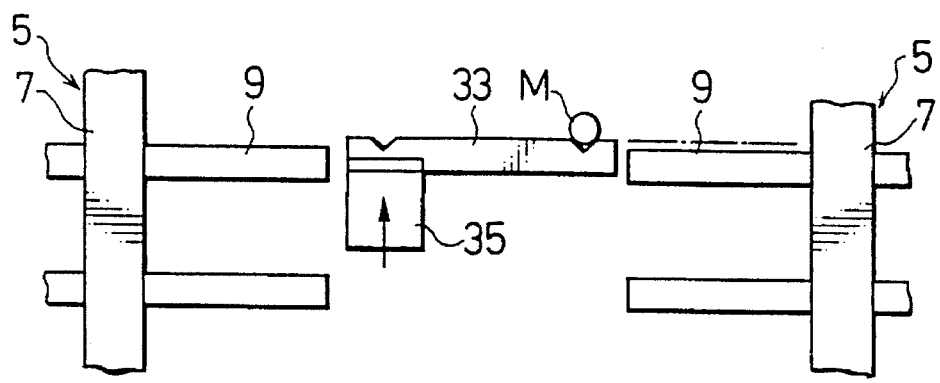
Figure 10J:
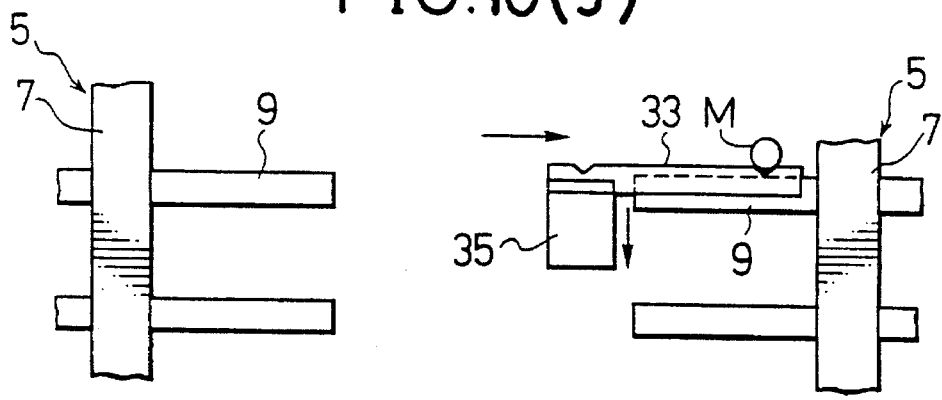

Then, the lifting beam 35 is slightly lowered (FIG. 10E), and the lifting arms 33 are moved to the left (FIG. 10F). After it, the plungers 55 are lowered to place the bar M in the right seats 33G of the lifting arms 33 (FIG. 10G).

Then, the lifting arms 33 are moved towards right (FIG. 10H), and the lifting beam 35 is slightly raised (FIG. 10I) and then moved to the right and slightly lowered (FIG. 10J), so that the bar M Is placed on the opposite shelf.

As clearly understood from the above description, a bar is conversely moved from the right shelf frame to the left shelf frame in a similar way.

In the operation to transfer the bar M between two adjacent shelf frames 5, the bar M is clamped or unclamped by the holding devices 53 when necessary. Thus, the bars M are transferred safely at a high speed.

According to the second embodiment, the bar M can be easily passed through the lifting beam 35 between two adjacent shelves. Thus, the bar or bars M on an original shelf of a shelf frame are quickly and safely moved to a free shelf of the opposite shelf frame as well as a free shelf provided at different height of the original shelf frame. The original shelf becomes free and can be used for storing new bars.

FIG. 11 shows main portions of a third embodiment. In this third embodiment, the lifting beam 35 is provided with a plurality of guide rails 83 extending in the direction Y. Also, a slider 85 for moving along the guide rails 83 is mounted on the lifting beam 35. A chain or rack 87 is provided on the lifting beam 35, while one or two self-running motors 89 each of which having a pinion gear 91 are attached to the slider 85. The motors 89 rotate the pinion gears 91 which engage the rack 87 and therefore cause the slider 85 to run in the direction Y.

A plurality of horizontally rotatable lifting arms 93 for carrying a material bar M, for example, two in this embodiment are mounted on the slider 93. A horizontally rotatable member 95 for receiving the bar M is provided on a distal end of each lifting arm 33.

As shown in FIG. 12, a rotary shaft 97 is integrally attached to a proximal end of the lifting arm 33. The lifting arm 33 is pivotably supported on the slider 85 about a fixing pin 99 which passes through the rotary shaft 97 and is fixedly embedded in the slider 85, a gear 101 is attached to the rotary shaft 97. The gear 101 is connected to a motor 105 on the slider 85 through a transmission mechanism 103 such as a chain, gears, or the like. Hence, the lifting arm 93 horizontally rotates when the motor 105 operates.

A rotary pin 107 is rotatably mounted in the distal end of the lifting arm 93. A sprocket 109 is attached to the rotary pin 107, while a sprocket 111 is attached to the fixing pin 89. A chain or toothed belt 113 is expanded around the sprockets 109 and 111. The sizes of the sprockets 109 and 111 are the same. The receiving member 95 is secured to the top of the rotary pin 107, and is formed with a V-shaped groove or seat 95G which is oriented in the direction Y.

When the motor 105 rotates the lifting arm 33 an amount of theta in the counterclockwise direction as shown in FIG. 13, the seat 95G rotates the same amount theta in the clockwise direction by means of the expanded toothed belt 113 and is therefore oriented always in the direction Y.

Accordingly, the lifting arms 93 extrude in a direction from the slider 85 and transfer the bar M with respect to a shelf 11 of the shelf frames 5. In this transfer, the lifting beam 35 is moved in the direction X in relation to the amount theta of the rotation of the lifting arms 93 to carry out the transfer with efficiency. Similarly, the arms 93 are moved in the direction X when the bar M is transferred between right and left shelves.

According to the third embodiment, the slider 85 can be positioned in any place in the direction Y by controlling the self-running motor 89, namely, a front or rear station FS or RS, or a central portion of the lifting beam 35. Hence, the slider 85 can transfer bars MA and MB stored in the front and rear stations FS, RS and a long bar ML. Also, the bars MA and MB are transferred between the front and rear stations.

FIG. 14 shows a modified example of the third embodiment. In this example, a plurality of sliders (85A, 85B are mounted on the lifting beam 35. The distance between the sliders 85A and 85B is adjusted in relation to the length of the material bar M. The bar M is carried in a stable manner by the suitably positioned sliders 85A, 85B.

In the third embodiment described above, the lifting beam 93 can be vertically moved while the lifting arms 93 are withdrawn to the slider(s) 85, or 85A and 85B. Hence, the distance L between the frames 5 can be smaller even if the lifting arms 33 are relatively long, and therefore the overall size of the spatial storing system can be smaller.

FIG. 15 shows a forth embodiment. In this forth embodiment is made up by combining the second and third embodiments. In the forth embodiment, the lifting arms 33 which are horizontally movable in the direction X are mounted on the slider 85. FIG. 16 shows a fifth embodiment in which the supporting devices 51 and the holding devices 53 are further provided on the slider 85.

In the drawing the same reference numerals are used for the same elements as those of the carrying device 51 and the holding device 53 of the second embodiment, and a further description for the elements is omitted.

In these embodiment, the same effect can be obtained.

FIG. 17 shows a sixth embodiment. In the sixth embodiment, rotatable right and left lifting arms 123R, 123L are attached to a slider 121 which encloses the lifting beam 35 and is supported by the lifting beam 35.

The lifting arms 123R, 123L are supported by lower right and left portions of the slider 121 through pivots 125R. 125L. The lifting arms 123R and 123L are in the shape of bell cranks. Nuts 129 are attached to distal ends of crank arms of the lifting arms 123R, 123L through pins 127R, 127L. Motors 135R, 135L for rotating the arms 123R, 123L are mounted through pivots 133 on brackets 131 which are secured to upper left and right portions of the slider 121. Vertical ball screws 137L, 137L are screwed into the nuts 129 and driven by the motors 135R, 135L.

Accordingly, by driving the motor 135R, the right lifting arm 123R is switched into a vertical or horizontal position. Similarly, the left lifting arm 123L is switched into vertical or horizontal position by driving the motor 135L.

According to the embodiment, the right or left lifting arm 123R or 123L is selectively switched into horizontal position, therefore the bars M are transferred with respect to right and left shelves 11 of the shelf frames 5. The same effects are obtained also in this embodiment. For example, the distance between the adjacent frames 5 can be smaller.

I claim:

1. A transfer device for transferring elongate bars with respect to a spatial storing system which includes a shelf frame provided with vertically arranged multiple shelves constituted of a plurality of supporting beams for carrying the bars, comprising:

a movable beam disposed above the shelf frame and extending in a longitudinal direction of the bars, the movable beam being movable in a direction perpendicular to the longitudinal direction of the elongate bars;

a lifting beam vertically movably mounted on the movable beam and extending in the longitudinal direction of the bars; and at least one slider mounted on the lifter beam for moving in the longitudinal direction of the lifting beam, the slider being provided with lifting arms for carrying the bars.

2. The transfer device of claim 1, wherein a plurality of the sliders are mounted on the lifting beam, the sliders being separately or simultaneously movable in a longitudinal direction of the lifting beam, and the lifting arm on each slider being separately or simultaneously rotatable, or extrudable and recedable with respect to the slider.

3. The transfer device of claim 1, wherein the lifting arms on the slider are extrudable and recedable in a longitudinal direction thereof, or horizontally rotatable, and the slider is provided with a supporting device for supporting and raising the bar transferred onto the slider.

4. The transfer device of claim 3, wherein the slider is further provided with a holding device for holding and preventing the bar supported by the supporting device from falling down.

5. The transfer device of claim 2, wherein the lifting arms on the slider are extrudable and recedable in a longitudinal direction thereof, or horizontally rotatable, and the slider is provided with a supporting device for supporting and raising the bar transferred onto the slider.

6. A method for transferring elongate bars by a transfer device for transferring the bars in a spatial storage system which includes vertically arranged shelves for storing the elongate bars, the transfer device including lifting arms attached to a slider mounted on a lifting beam which is vertically movably provided in the transfer device, the slider being movable in a longitudinal direction of the lifting beam, comprising the steps of:

moving the slider to a first position in a longitudinal direction of the lifting beam;

discharging a bar by the lifting arms from a first shelf of the storing system, the first shelf being related to the first position;

moving the slider to a second position in the longitudinal direction of the lifting beam; and placing the bar on a second shelf of the storing system, the second shelf related to the second position.

7. A transfer device for transferring elongate bars with respect to a spatial storing system which includes a shelf frame provided with vertically arranged multiple shelves including a plurality of supporting beams for carrying the bars, comprising:

a moveable beam disposed above the shelf frame and extending in a longitudinal direction of the bars, the movable beam being movable in a direction perpendicular to the longitudinal direction of the elongate bars;

a lifting beam vertically movably mounted on the movable beam;

a plurality of lifting arms attached to the lifting beam and extending, for carrying the bar, in the direction perpendicular to the longitudinal direction of the bars, the lifting arms being extrudable and recedable separately or simultaneously in a longitudinal direction thereof in relation to length of the bar to be carried; and a plurality of supporting devices provided on the lifting beam, for supporting and raising a bar transferred onto the lifting beam, each supporting device including a vertically movable plunger liar supporting a bar at a top portion thereof.

8. The transfer device of claim 7, further comprising a holding device mounted on the lifting beam, for holding and preventing the bar supported by the supporting devices from falling down.

9. The transfer device of claim 7, wherein the plunger is movable between an upper position and a lower position; and in the upper position of the plunger, the top portion of the plunger is above an upper surface of the lifting arm, and in the lower position of the plunger, the top portion of the plunger is below the upper surface of the lifting arm.

10. The transfer device of claim 9, wherein the plunger is formed at the top portion thereof with a groove for receiving a bar.

11. The transfer device of claim 10, further comprising a hydraulic cylinder for moving the plunger in a vertical direction.

12. The transfer device of claim 7, wherein each supporting device is located between adjacent lifting arms in a longitudinal direction of the lifting beam.

13. A method for transferring an elongated bar in a transfer device for transferring elongate bars with respect to a spatial storing system which includes a shelf frame provided with vertically arranged multiple shelves including a plurality of supporting beams for carrying the bars, comprising:

a moveable beam disposed above the shelf frame and extending in a longitudinal direction of the bars, the movable beam being movable in a direction perpendicular to the longitudinal direction of the elongate bars;

a lifting beam vertically movably mounted on the movable beam;

a plurality of lifting arms attached to the lifting beam and extending, for carrying the bar, in the direction perpendicular to the longitudinal direction of the bars, the lifting arms being extrudable and recedable separately or simultaneously in a longitudinal direction thereof in relation to length of the bar to be carried; and a plurality of supporting devices provided on the lifting beam, for supporting and raising a bar transferred onto the lifting beam, each supporting device including a vertically movable plunger for supporting a bar at a top portion thereof, wherein the plunger is movable between an upper position and a lower position; and in the upper position of the plunger, the top portion of the plunger is above an upper surface of the lifting arm, and in the lower position of the plunger, the top portion of the plunger is below the upper surface of the lifting arm, the method comprising the steps of:

supporting a bar on first portions of the lifting arms;

moving the plunger downwardly so that the upper portion of the plunger is below the upper surface of the lifting arms;

moving the lifting arms in the direction perpendicular to the longitudinal direction of the bar so that, the bar supported on the first portions are located above the plunger;

moving the plunger upwardly so that the bar is transferred from the lifting arms to the plunger;

moving the lifting arms in the direction perpendicular to the longitudinal direction of the bar so that second portions of the lifting arms are located below the bar supported by the plunger; and moving the plunger downwardly so that the bar is put on the second portions of the lifting arms.

* * * * *

UNITED STATES PATENT AND TRADEMARK OFFICE
CERTIFICATE OF CORRECTION

PATENT NO. : 5,507,613
DATED : April 16, 1996
INVENTOR(S) : Toru Tokiwa

It is certified that error appears in the above-indentified patent and that said Letters Patent is hereby corrected as shown below:

Column 11, claim 7, line 44, change "liar" to --for--.

Signed and Sealed this

Eleventh Day of November, 1997

Attest:

BRUCE LEHMAN

Attesting Officer

Commissioner of Patents and Trademarks